United States Patent [19]

Warrenchak et al.

[11] Patent Number: 5,037,557
[45] Date of Patent: Aug. 6, 1991

[54] TREATED SILICA FOR OIL ABSORPTION

[75] Inventors: James F. Warrenchak, Albany; Edward F. Phelan, Troy, both of N.Y.

[73] Assignee: General Electric Company, Waterford, N.Y.

[21] Appl. No.: 569,251

[22] Filed: Aug. 15, 1990

Related U.S. Application Data

[63] Continuation of Ser. No. 405,919, Sep. 12, 1989, abandoned.

[51] Int. Cl.$^5$ ................................................. C02F 1/28
[52] U.S. Cl. ..................................... 210/691; 210/924
[58] Field of Search ............ 210/671, 680, 691, 242.4, 210/924

[56] References Cited

U.S. PATENT DOCUMENTS

| | | | |
|---|---|---|---|
| 2,819,151 | 1/1958 | Flemmert | 423/337 |
| 2,938,009 | 5/1960 | Lucas | 260/37 |
| 3,004,859 | 10/1961 | Lightenwalner | 106/308 |
| 3,053,627 | 9/1962 | Flemmert | 423/336 |
| 3,203,759 | 8/1965 | Flemmert | 423/337 |
| 3,382,170 | 5/1968 | Pape | 210/36 |
| 3,562,153 | 2/1971 | Tully et al. | 210/680 |
| 3,635,743 | 1/1972 | Smith | 106/490 |
| 3,847,848 | 11/1974 | Beers | 260/18 |
| 4,054,689 | 10/1977 | Calvin | 427/215 |
| 4,151,078 | 4/1979 | Calvin | 210/671 |
| 4,526,780 | 7/1985 | Marschner et al. | 424/66 |
| 4,536,399 | 8/1985 | Flynn et al. | 514/63 |

FOREIGN PATENT DOCUMENTS 84402719.3  7/1985  European Pat. Off. .

Primary Examiner—Ivars Cintins
Attorney, Agent, or Firm—Mark R. Warfield

[57] ABSTRACT

Fumed silica treated with octamethylcyclotetrasiloxane or hexamethyldisilazane are disclosed for the absorption of hydrocarbon spills, particularly on a body of water without the absorption of water.

6 Claims, No Drawings

TREATED SILICA FOR OIL ABSORPTION

This application is a continuation of application Ser. No. 405,919, filed Sept. 12, 1989, now abandoned.

BACKGROUND OF THE INVENTION

The present invention relates to a method using fumed silica as a hydrophobic sorbent material, particularly for the sorbing of hydrocarbons from the surface of water.

A serious problem which long has plagued industrial and environmental concerns is the removal of hydrocarbons, particularly oil, from unwanted areas into or onto which it has been discharged. Of particular concern is the removal of discharged oil from water or shore areas which occurs as a result, for example, of oil tanker accidents at sea or mishaps in the loading or unloading of oil from these tankers in port. Other occasions where hydrocarbon removal is of concern range from problems such as the discharge of oil at areas around oil wells and oil storage facilities or the cleaning of surfaces in which oil was stored (e.g. on-shore storage tanks, holds of tankers, etc.) to problems such as the discharge or leaking of oil from vehicles onto roads or driveway surfaces. Further, oil-water emulsions which are used, for example, as cutting fluids require separation of oil from the water prior to disposal.

Numerous solutions have been proposed for dealing with the problem of removing hydrocarbons from unwanted areas. One of these solutions involves the use of bacteria to degrade the hydrocarbons. However, such methods are expensive, raise important environmental concerns, and are often ineffective in cold weather environments.

Another solution to the problem lies in the use of absorbents which are intended to remove the hydrocarbons from unwanted areas by the use of physical forces rather than chemical break down of the hydrocarbons, i.e. where it is drawn into the absorbent material in much the same way water is drawn into a sponge.

Numerous examples of absorbents of this type are found in the literature. In U.S. Pat. No. 3,630,891 there is disclosed an oil absorbent prepared from wood fibers which have been treated with sizing material to render the fibers water repellant.

U.S. Pat. No. 3,770,575 discloses wet wood pulp treated with sizing and subjected to flash drying.

U.S. Pat. No. 3,382,170 discloses the use of perlite, a mineral containing silica, to absorb oil.

U.S. Pat. No. 3,591,524 discloses an oil absorbent comprised of cellulosic base impregnated with a complex oil-in-water, ammonium or amine-containing emulsion.

U.S. Pat. No. 3,756,948 discloses the use of polystyrene foam crumbs.

U.S. Pat. No. 4,131,543 discloses the use of insoluble silicate aggregates to absorb oil as well as other industrial solvents and acids.

U.S. Pat. No. 4,172,039 discloses the use of porous coconut husk material, such as coir dust, treated with an oleophilic-hydrophobic substance. The patent also discuss a method of absorption comprising the use of containers filled with the sorbent and which float on the surface of the water thereby absorbing the oil.

U.S. Pat. No. 4,343,680 discloses enhancing the oleophilic-hydrophobic properties of wood pulp by heating and fluffing.

U.S. Pat. No. 4,670,156 discloses the use of fibrous cellulosic material, e.g. sulphite reject, which is subjected to forced heating to enhance hydrophobic and oleophilic properties.

Some of the limitations of the examples mentioned above include prohibitive cost; ineffectiveness in extreme environmental conditions; tackiness of the material after it is saturated with oil; retention of oil in the absorbent until the absorbent is removed from the water; and ineffective or temporary hydrophobic characteristics.

In order to effectively remove hydrocarbons from water it is necessary that the absorbent absorb only the hydrocarbon and not the water. That is, the material should be both oleophilic and hydrophobic. Fine particulate silica has been known to exhibit both of these properties. See for example U.S. Pat. No. 4,054,689 which discloses silica treated with HF in order to make the silica hydrophobic without disturbing its oleophilic properties. The resultant material readily absorbs oil from the surface of water. However, upon standing in water for a number of hours, the silica loses its hydrophobicity, becomes hydrophilic, and enters the water, leaving the oil floating on top.

The aforementioned U.S. Pat. No. 3,382,170 discloses that the mineral "Perlite", which contains 65%–75% by weight $SiO_2$, exhibits hydrophobic properties upon treatment with an emulsion of polydimethylsiloxane in water at 200° C. to 500° C.

U.S. Pat. No. 4,526,780 discloses the use of fumed silica as a suspending agent in a deodorant composition which aids in the absorption of silicone oils. However, it is also taught that fumed silicone alone will not yield a stable product because the oil separates out.

U.S. Pat. No. 4,708,997 discloses the treatment of hydrophilic silicon dioxide with polydimethyldichlorosilane in order to render the material hydrophobic. This material is then used as one part of a suspending agent in the water-in-oil suspension polymerization of water soluble monomers.

U.S. Pat. No. 4,191,677 discloses the use of "TULANOX" fumed silica to prevent water absorption in a two-part epoxy adhesive system.

U.S. Pat. No. 4,536,399 discloses the use of fumed silica to absorb oil from skin.

Although no documentation has been found for support, it is understood that Cabot Corporation has experimented with hexamethyldisilazane (HMDZ) treated fumed silica for absorption of crude oil on sea water.

The problem with using amorphous silica, and in particular fumed silica, is that it is normally hydrophilic and oleophilic. A treatment process is needed in order to render the material hydrophobic, and these treatment process are not always permanent. That is, after a period of time after exposure to water the silica often reverts back to its original hydrophilic property.

Another problem is that after treated silica is exposed to and has absorbed the hydrocarbons, the material does not agglomerate. Thus, is is difficult, if not impossible, to recover the saturated material without the use of very fine mesh screens.

It is therefore an object of this invention to provide a method for absorbing hydrocarbons from water while not absorbing the water.

It is further an object of this invention to provide a method for recovering hydrocarbons from the surface of water by the use of an absorbent material that can remain in water indefinitely without losing its hydrophobicity.

It is further an object of this invention to provide a method for recovering hydrocarbons from the surface of water by the use of an absorbent material that can be easily recovered after becoming saturated with the hydrocarbons.

It is further an object of this invention to provide a method for recovering hydrocarbons from the surface of water by the use of an absorbent material that is both hydrophobic and oleophilic.

Other objects will become apparent to those skilled in the art upon reading the following.

SUMMARY OF THE INVENTION

There is provided by this invention a method for absorbing hydrocarbons from water comprising the steps of:
(a) adding treated fumed silica onto the surface of water and hydrocarbon mixture; and
(b) gently agitating the water, hydrocarbons and fumed silica mixture.

DETAILED DESCRIPTION OF THE INVENTION

The fumed silica that is contemplated by this invention is that formed by the pyrogenic process as taught by Spialter et al. in U.S. Pat. No. 2,614,906 and Hugh et al. in U.S. Pat. No. 3,043,660, hereby incorporated by reference. For example, fumed silica filler may be made by burning silanes, e.g. silicon tetrachloride, trichlorosilane, etc. The resultant silica has a surface area of at least 50 $m^2$ per gram and preferably from about 100 to about 500 $m^2$ per gram. Most preferably the fumed silica will have a surface area of from about 150 to about 250 $m^2$ per gram.

The treating agent used to treat the fumed silica is any material which renders the fumed silica essentially hydrophobic without affecting its oleophilic properties. Preferably the filler is treated with a cyclic siloxane as taught by Lucas in U.S. Pat. No. 2,938,009 or by Brown in U.S. Pat. No. 3,334,062, hereby incorporated by reference.

Alternatively, the fumed silica may be treated with ammonia or a silazane as taught by Smith in U.S. Pat. 3,635,743 or by Beers in U.S. Pat. No. 3,847,848, hereby incorporated by reference.

The best treating agent as far as imparting superior hydrophobicity while maintaining oleophilicity is 2,4,6,8-octamethylcyclotetrasiloxane (tetramer). An alternative, although less preferred, fumed silica is one that is first treated by 2,4,6,8-octamethylcyclotetrasiloxane and subsequently treated by hexamethyldisilazane (HMDZ).

The fumed silica that has been treated by any of the processes described above will selectively absorb hydrocarbons while not absorbing any water. The hydrocarbons contemplated by this invention include industrial solvents such as toluene, benzene, methylethylketone (MEK), tetrahydrofuran (THF), mineral spirits, etc.; acids such as acrylic acid, etc.; high molecular weight alcohols; and monomers such as vinyl chloride, styrene, etc.

The treated fumed silica of this invention is particularly well suited for absorption of crude oil and products derived therefrom, including gasolines and diesel fuels, motor oils, heating oils, etc. The treated fumed silica of this invention is also well suited for absorption of oil from oil-in-water, emulsions such as that used for metal cutting processes.

In utilizing this invention in connection with an oil spill on the open seas or other bodies of water, the above described fumed silica is spread upon the oil layer, which floats on the water, by use of boats or airplanes. The fumed silica may be propelled in the nature of a jet stream into the oil layer from above which causes the same to penetrate the oil and to mix with it efficiently. Alternatively, the wave action of the water itself may be used to mix the oil and the fumed silica. In any event in order to maximize the effectiveness of the oil absorption, the fumed silica must be gently mixed into the oil phase. It would be most advantageous to introduce the treated, fumed silica at the water/oil interface, because this would decrease any handling problems caused by the low density silica.

Upon exposure of the treated fumed silica of this invention to oil the fumed silica becomes substantially saturated with about 1 to 10 times its own weight in oil. The fumed silica of this invention has a selective absorption whereby it shows a preference for the oil rather than for the water. Thus, even when previously soaked in water before spreading the same upon an oil spill, it will be found that this absorbent material is saturated with oil and rejects the water when spread upon a spill.

Upon becoming saturated with oil, the fumed silica of this invention transforms from a powder into globules that range in size from 1/16th inch to 2 inches or greater. Also, even after being saturated with oil, the fumed silica is less dense than water. Thus, the globules will float for periods of 30 days or longer upon the surface of the water allowing for easy recovery by skimming, screening, or filtering.

In order to maximize the amount of oil absorption by the fumed silica while still being able to easily separate the resulting globules from the water it is necessary to use an excess of silica. If less than an excess is used the resulting globules are tacky and are hard to screen off.

It has been found that 100 gallons of oil may be absorbed by from about 120 pounds to about 180 pounds of treated, fumed silica filler. More preferably, 100 gallons of oil may be absorbed by from about 150 to about 165 pounds of treated, fumed silica filler. It is recognized, however, that precise measurements of oil on the surface of a body of water may not be possible. In such a case the application of treated fumed silica to a depth of at least about 1 to 1.5 centimeters onto the surface of the oil will suffice. The actual amount necessary to absorb the oil is dependent on the viscosity of the oil and the thickness of the oil layer. The greater the viscosity of the oil, the more fumed silica is necessary for complete absorption.

Still another use of the fumed silica of this invention would be as a material to absorb hydrocarbons out of a mixture or emulsion of such with water. The discharge from the ship's bilges and from the flushing of tankers and barges could be handled in this manner so that the discharged water would be clean enough to cause no pollution problems and the silica material, after saturation with the oil, could be transported to a point of recovery or disposal. Another use for such a filter of this material might be in the absorption of oil that is emulsified with water, such as that used in the machine tool industry as a coolant during drilling and grinding operations, in order to purify the water and reduce pollution from its discharge.

Another use of this invention might be in the absorption of oil that is spilled on land, for example a well head or around a storage tank, so that the oil could be safely transported by any ordinary bulk container means to a point of disposal. In this application, the fumed silica, as hereinabove described, would merely have to be emulsified with water and mixed with the oil contaminated ground. As the fumed silica absorbs the oil, globules will form which can easily be collected and disposed of.

In some cases, oil spills reach sandy beaches to pollute the same. To clear up such a beach, the oil contaminated sand may be mixed with an emulsion of the fumed silica of this invention and water and then, upon contact with the sand, the oil would remain in the fumed silica and the clean sand recovered.

High or low ambient temperatures have no effect upon the absorption of oil according to this invention.

Only gentle agitation is necessary to cause the absorption of hydrocarbons according to the teachings of this invention. In fact gentle agitation is preferred since violent agitation may tend to cause the treated, fumed silica to act as a surfactant and form an oil-in-water emulsion. Preferred agitation is exemplified by a gentle wave action on a body of water which causes the water, oil, and silica to gently mix.

While this invention has been described chiefly in connection with crude oil, which has been involved in many spills on the high seas, it is also effective in absorbing gasoline, fuel oil, kerosene, emulsified oil, refined oil with additives, motor oil, cutting oil, and other hydrocarbon oils. The primary requirements for the hydrocarbon are the specific gravity, it must be less dense than the water so as to float. And, it should not be soluble, or only slightly soluble, in the water.

The following examples illustrate the oil absorption characteristics of treated fumed silica. The examples are intended to illustrate to those skilled in the art the process of this invention, and they are not intended to limit the scope of the invention in any way.

EXAMPLE 1

A 2.5 gallon container was ½ filled with water, creating approximately 270 cm$^2$ of water surface area. Into the container was then added either #6 Fuel Oil (FO), #634 Mobile Gear Oil (MGO), or a combination of equal parts of #6 FO and #634 MGO according to Table I. To the water/oil combination was then added treated fumed silica according to Table I.

TABLE I

| | SAMPLE | | | |
|---|---|---|---|---|
| | A | B | C | D |
| Fumed silica (amount — gm) | 11.0 | 18.0 | 8.2 | 8.2 |
| Treating agent | OMCTS | OMCTS | OMCTS/HMDZ | OMCTS |
| Surface area (m$^2$/gm) | 200 | 200 | 200 | 325 |
| Oil type | #634MGO | #6FO | #6FO | #6FO |
| Oil (amount — gm) | 62.0 | 51.0 | 50.0 | 55.0 |

After bubbling compressed air into each container to agitate each sample the results were as follows:

Sample A: The silica absorbed 100% of the oil and formed globules ranging in size from ½ to 2 cm which were easily screened off.

Sample B: The silica absorbed 95.3% of the oil. The remaining oil sank to the bottom, preventing absorption by the silica. Slightly more mixing was needed than in Example A. Some silica flew off the top of the surface during bubbling.

Sample C: The silica absorbed 98.4% of the oils. Globules of 4 to 6 cm were easily screened from the clear water that remained.

Sample D: The silica did not completely absorb the oil and no free floating globules were formed.

What is claimed is:

1. A method for absorbing hydrocarbons from water consisting of the steps of:
   (a) adding a material consisting of treated fumed silica onto the surface of water and hydrocarbon mixture, the fumed silica having been treated so as to render it oleophilic and permanently hydrophobic; and
   (b) agitating the water, hydrocarbons and fumed silica mixture,
   wherein the silica forms free flowing globules upon being saturated with the hydrocarbons.

2. The method of claim 1 wherein the silica has a surface area of at least 50 m$^2$ per gram.

3. The method of claim 1 wherein the silica has a surface area of from about 100 m$^2$ per gram to about 500 m$^2$ per gram.

4. The method of claim 1 wherein the silica has a surface area of from about 150 m$^2$ per gram to about 250 m$^2$ per gram.

5. The method of claim 1 wherein the silica is added so that there is a layer of from about 1 to about 1.5 cm of silica on the surface of the water and hydrocarbons.

6. The method of claim 1 wherein the water, hydrocarbons and fumed silica mixture is agitated by the wave action of the water.

* * * * *